US009783686B2

(12) United States Patent
Kim et al.

(10) Patent No.: US 9,783,686 B2
(45) Date of Patent: Oct. 10, 2017

(54) SURFACE-TREATED STEEL PLATE AND PRODUCTION METHOD FOR SAME

(71) Applicant: POSCO, Pohang-si, Gyeongsangbuk-do (KR)

(72) Inventors: Joong-Kyu Kim, Gwangyang-si (KR); Hyun-Chu Yun, Seoul (KR); Hye-Jin Yoo, Gwangyang-si (KR); Jong-Sang Kim, Gwangyang-si (KR); Yong-Gyun Jung, Gwangyang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 51 days.

(21) Appl. No.: 14/655,668

(22) PCT Filed: Dec. 24, 2013

(86) PCT No.: PCT/KR2013/012131
§ 371 (c)(1),
(2) Date: Jun. 25, 2015

(87) PCT Pub. No.: WO2014/104724
PCT Pub. Date: Jul. 3, 2014

(65) Prior Publication Data
US 2015/0344701 A1    Dec. 3, 2015

(30) Foreign Application Priority Data
Dec. 27, 2012   (KR) .................. 10-2012-0154281

(51) Int. Cl.
| | | |
|---|---|---|
| *B32B 15/08* | (2006.01) | |
| *B32B 15/18* | (2006.01) | |
| *B05D 3/14* | (2006.01) | |
| *C09D 5/08* | (2006.01) | |
| *C09D 175/04* | (2006.01) | |
| *B05D 3/00* | (2006.01) | |
| *C09D 7/12* | (2006.01) | |
| *C08K 3/04* | (2006.01) | |
| *B32B 27/20* | (2006.01) | |
| *B32B 27/30* | (2006.01) | |
| *B32B 27/36* | (2006.01) | |
| *B32B 27/38* | (2006.01) | |
| *B32B 27/40* | (2006.01) | |

(52) U.S. Cl.
CPC .............. *C09D 5/08* (2013.01); *B05D 3/207* (2013.01); *B32B 15/08* (2013.01); *B32B 15/18* (2013.01); *B32B 27/20* (2013.01); *B32B 27/308* (2013.01); *B32B 27/36* (2013.01); *B32B 27/38* (2013.01); *B32B 27/40* (2013.01); *C08K 3/04* (2013.01); *C09D 5/084* (2013.01); *C09D 7/1291* (2013.01); *C09D 175/04* (2013.01); *B32B 2264/108* (2013.01); *B32B 2307/302* (2013.01); *B32B 2307/714* (2013.01); *Y10T 428/265* (2015.01); *Y10T 428/31529* (2015.04); *Y10T 428/31605* (2015.04); *Y10T 428/31678* (2015.04); *Y10T 428/31681* (2015.04); *Y10T 428/31692* (2015.04)

(58) Field of Classification Search
CPC .......... B05D 3/207; B32B 15/08; B32B 15/18
See application file for complete search history.

(56) References Cited

U.S. PATENT DOCUMENTS

| 2011/0256387 A1* | 10/2011 | Cho ................... C08G 18/3215 |
| | | 428/336 |
| 2012/0171438 A1* | 7/2012 | Roberts, III ........... B82Y 30/00 |
| | | 428/206 |

FOREIGN PATENT DOCUMENTS

| CN | 102675830 A | 9/2012 |
| EP | 2360216 A2 | 8/2011 |
| JP | 2003-321554 A | 11/2003 |
| JP | 2011-086472 A | 4/2011 |
| KR | 10-2009-0044220 A | 5/2009 |
| KR | 10-2010-0050252 A | 5/2010 |
| KR | 10-0972637 B1 | 7/2010 |
| KR | 10-2011-0045466 A | 5/2011 |
| KR | 2011-0092207 A | 8/2011 |
| WO | 2010/117389 A1 | 10/2010 |

OTHER PUBLICATIONS

Singh et al; Surface and Coating Technology, 232 (2013), 475-481.*
Diba et al; Progress in Materials Science, 82 (2016) 83-117.*
Chinese Office Action dated Jul. 5, 2016 issued in Chinese Patent Application No. 201380067745.3 (English translation).
Notice of Office Action issued in corresponding Japanese Patent Application No. 2015-550311, issued on October 4, 2016; with English translation.
International Search Report dated Jan. 17, 2014 issued in International Patent Application No. PCT/KR2013/012131 (English translation thereof).
Extended European Search Report dated Sep. 16, 2015 issued in European Patent Application No. 13866751.4.

* cited by examiner

*Primary Examiner* — Karuna P Reddy
(74) *Attorney, Agent, or Firm* — McDermott Will & Emery LLP

(57) ABSTRACT

The present invention relates to a surface-treated steel plate and to a production method for same, and more specifically relates to a surface-treated steel plate having outstanding corrosion resistance and thermal conductivity. In order to achieve this aim, in the present invention a macromolecular resin composition comprising graphene, which has highly outstanding physical properties including electrical conductivity, is coated onto the surface of a steel foundation plate, thereby making it possible to provide a surface-treated steel plate able to supremely well ensure not only corrosion resistance but also the intrinsic characteristics of graphene due to the macromolecular resin composition.

9 Claims, No Drawings

SURFACE-TREATED STEEL PLATE AND PRODUCTION METHOD FOR SAME

RELATED APPLICATIONS

This application is the U.S. National Phase under 35 U.S.C. §371 of International Application No. PCT/KR2013/012131, filed on Dec. 24, 2013 which in turn claims the benefit of Korean Patent Application No. 10-2012-0154281 filed on Dec. 27, 2012, the disclosures of which the applications are incorporated by reference herein.

TECHNICAL FIELD

The present disclosure relates to a surface-treated steel sheet and a method for manufacturing the same and, more specifically, to a surface-treated steel sheet having excellent corrosion resistance and thermal conductivity.

BACKGROUND ART

Generally, steel sheets for applications such as automobile panels are treated with phosphates and are painted after a car body assembly process in an automotive manufacturing plant. In this case, several folded portions may be present in steel sheets of an assembled car body. Since it is difficult for phosphates or paint to permeate into the folded portions, the folded portions may be vulnerable to corrosion.

In the related art, a method of sealing the folded portions of steel sheets has been used to prevent corrosion-causing substances from permeating into the folded portions. However, since the method decreases the productivity of final products and increases manufacturing costs, surface-treated steel sheets having high corrosion resistance and thus not requiring sealing treatments have been in demand.

Recently, steel sheets formed by coating base steel sheets with organic films have been widely researched as types of surface-treated steel sheets not requiring sealing treatments. As a result, surface-treated steel sheets coated with organic films of a uniform thickness are being commercialized.

Such surface-treated steel sheets coated with the organic films ensure corrosion resistance even in portions thereof which are not painted or treated with phosphate, but the weldability thereof during electric resistance welding may be lowered due to the organic films being relatively thick.

Therefore, a surface-treated steel sheet having high corrosion resistance and excellent weldability during electric resistance welding is required.

DISCLOSURE

Technical Problem

An aspect of the present disclosure provides a surface-treated steel sheet having excellent weldability due to high thermal conductivity as well as high corrosion resistance, and a method for manufacturing the same.

Technical Solution

According to an aspect of the present disclosure, there is provided a surface-treated steel sheet including a base steel sheet and a polymer resin layer containing graphene on the top of the base steel sheet, wherein the graphene is arranged within the polymer resin layer.

According to another aspect of the present disclosure, there is provided a method for manufacturing a surface-treated steel sheet, including: preparing a base steel sheet; coating the top of the base steel sheet with a polymer resin composition containing graphene; and drying and curing the coated base steel sheet to form a polymer resin layer containing graphene, wherein the graphene is arranged within the polymer resin layer by applying an electric field or a magnetic field to the bottom of the coated base steel sheet during drying.

Advantageous Effects

According to an exemplary embodiment of the present inventive concept, a surface-treated steel sheet is prepared by forming a polymer resin layer containing graphene on the top of a base steel sheet so that it may have superior corrosion resistance to that of a steel sheet prepared by using a conventional organic coating film, and may also obtain thermal conductivity.

In addition, according to another exemplary embodiment of the present inventive concept, a surface-treated steel sheet may include a polymer resin layer containing graphene having a uniform arrangement and thickness.

BEST MODE

The inventors of the present invention researched a surface-treated steel sheet for applications such as automobile panels in order to obtain superior corrosion resistance and ensure superior weldability during subsequent electric resistance welding to those of conventional surface-treated steel sheets, and discovered that in a case in which the surface of a steel sheet is coated with a polymer resin composition containing graphene having excellent properties such as electrical conductivity and mechanical strength so as to allow the graphene to have a uniform thickness, corrosion resistance and thermal conductivity may be obtained from the uniformly arranged graphene and the inherent properties of the graphene may also be imparted to the surface-treated steel sheet. Consequently, the inventors have completed the present inventive concept.

Graphene is a material containing carbon atoms and provided in the form of a thin layer having a thickness of a single carbon atom and a two-dimensional planar structure in which the carbon atoms are bonded together in a hexagonal honeycomb shape, and it is known that graphene has excellent properties such as strength, electric conductivity, thermal conductivity, and electrical characteristics.

Presently, research is being actively conducted by utilizing the properties of graphene in several industrial fields. For example, a technique of coating a substrate or the like with a graphene solution is being used. The graphene solution coating technique facilitates the coating of graphene in a simple way, but causes a problem in a case in which the coating of graphene sheets is not uniformly performed in the same direction.

According to the present inventive concept, there is provided a novel structure of a surface-treated steel sheet solving the aforementioned problems through the arrangement of graphene toward an interface between a base steel sheet and a resin layer or the surface of the resin layer.

That is, according to the research results of the inventors, since graphene is a carbon-based material and has a hexagonal sheet structure of carbon atoms through $SP^2$ bonding, it is able to effectively inhibit a fine-scale growth on the surface of a cold-rolled steel sheet. A graphene layer of a densely packed structure may effectively block the permeation of moisture or the like even in a corrosive environment, thereby imparting corrosion resistance to the steel sheet.

Therefore, the present inventive concept provides the surface-treated steel sheet having excellent corrosion resistance and thermal conductivity, the surface-treated steel sheet including the base steel sheet and the polymer resin layer containing graphene on the top of the base steel sheet, wherein the graphene sheets may be arranged inside the polymer resin layer in a certain direction.

Here, an average thickness of the polymer resin layer containing graphene formed on the top of the base steel sheet may be 0.5 to 5.0 μm, and more preferably 1 to 3 μm. When the average thickness of the polymer resin layer containing graphene formed on the top of the base steel sheet is less than 0.5 μm, the amount of graphene contained in the polymer resin layer is not sufficient to provide the inherent properties of graphene, and it may be difficult to ensure the corrosion resistance of the polymer resin layer itself. Conversely, when the average thickness of the polymer resin layer containing graphene exceeds 5.0 μm, the inherent properties of graphene are sufficiently obtained, but the polymer resin layer may be formed non-uniformly and the workability thereof in subsequent processing may be degraded.

A method for manufacturing a surface-treated steel sheet according to an embodiment of the present inventive concept is not particularly limited so long as a polymer resin layer containing graphene can be formed on the top of a base steel sheet. A method of preparing a graphene solution in advance and applying the prepared graphene solution to the surface of the base steel sheet to form a graphene layer is generally used, but such a method may cause problems in regard to process efficiency, adhesion, and the like.

Therefore, an aspect of the present inventive concept may provide a method of coating a base steel sheet with graphene sheets in a manner that the graphene sheets are arranged to have the same direction. That is, according to the present inventive concept, when the surface of the base steel sheet is coated with a polymer resin composition containing the graphene sheets, the graphene sheets contained in the composition may be arranged inside a polymer resin layer in a certain direction by using an electromagnetic field (an electric field or a magnetic field), thereby improving adhesion to the base steel sheet.

That is, according to the research results of the inventors, hydroxyl groups (OH) present at the edges of graphene have high solubility, and thus, in a case in which a graphene solution coating technique is used, a large-area thin film may be formed, and the adhesion of graphene to the base steel sheet may be improved by uniformly arranging the hydroxyl groups (OH) of graphene. In addition, the inherent properties of graphene may be effectively imparted thereto.

Hereinafter, examples of the method for manufacturing a surface-treated steel sheet, according to embodiments of the present inventive concept, will be detailed. The inventive concept may, however, be exemplified in many different forms and should not be construed as being limited to the specific embodiments set forth herein. While those skilled in the art could readily devise other varied embodiments through the addition, modification or deletion of elements, such embodiments may fall within the scope of the present inventive concept.

Hereinafter, a method for manufacturing a surface-treated steel sheet including a polymer resin layer containing graphene, according to an exemplary embodiment of the present inventive concept, will be detailed.

A method for manufacturing a surface-treated steel sheet having a polymer resin layer containing graphene formed on the surface thereof, according to an exemplary embodiment of the present inventive concept, may include: preparing a base steel sheet; coating the top of the base steel sheet with a polymer resin composition containing graphene; and drying and curing the coated base steel sheet. During drying, an electric field or a magnetic field may be applied to the bottom of the coated base steel sheet.

The base steel sheet used in the method for manufacturing a surface-treated steel sheet, according to the embodiment of the present inventive concept, is not particularly limited, and a general ferrous or non-ferrous steel material may be used therefor.

After the base steel sheet is prepared as stated above, the top of the base steel sheet may be coated with the polymer resin composition containing graphene.

Here, the polymer resin composition containing graphene to be used may be a composition in which graphene is contained in a general polymer resin composition. Any type of commonly used binder resin may be used for the polymer resin composition. Preferably, at least one resin selected from the group consisting of a urethane resin, an acryl resin, an epoxy resin, an ester resin, and an olefin resin may be used. More preferably, a urethane resin may be used. The polymer resin composition may further include a curing agent and a corrosion resistance enhancer as well as the binder resin.

Here, the content of the binder resin may be 10 to 90 parts by weight on the basis of the total weight of the resin composition. In a case in which the content of the binder resin is less than 10 parts by weight, the salt water resistance of the binder resin (for example, the urethane resin) and the chemical resistance thereof to the permeation of chemical substances may not be exhibited, whereby the chemical resistance and alkali resistance may be lowered. As a result, when being degreased with an alkaline solution of pH 10 or above for five minutes at 60° C., the resin film may be discolored or delaminated. Conversely, in a case in which the content of the binder resin exceeds 90 parts by weight, the stability of the resin solution due to a congealing phenomenon may be degraded, and manufacturing costs may be increased in an economically undesirable manner. Therefore, the resin composition may include 10 to 90 parts by weight of the binder resin on the basis of the total weight of the resin composition, and water as the remainder.

A urethane resin which is usable as the binder resin has high water resistance, chemical resistance, acid resistance, and alkali resistance, and a coated film of the urethane resin is soft and rigid, so that it may be widely used to coat a steel sheet, an aluminum plate, or the like so as to prevent surface scratching or to impart chemical resistance thereto. Therefore, any type of urethane resin commonly used in the art for the aforementioned purposes may be used. However, such a urethane resin has limitations in exhibiting softness and rigidity when used alone. Accordingly, in the embodiment of the present inventive concept, the urethane resin may be used by combining a soft urethane-based resin and a hard urethane-based resin.

In this case, the content of the soft urethane-based resin may be 5 to 95 parts by weight on the basis of a solid content of the urethane resin. In a case in which the solid content of the soft urethane-based resin is less than 5 parts by weight, workability may be improved, but thermal resistance and water resistance may be lowered. Conversely, in a case in which the solid content of the soft urethane-based resin exceeds 95 parts by weight, there is no effect of improving workability, and corrosion resistance may be significantly lowered.

The soft urethane-based resin may be a polyurethane resin prepared from isoporene diisocyanate, dibasic acid, and polyhydric alcohol, such as a polyurethane dispersion resin or a polyethylene modified polyurethane resin, or a polyurethane resin prepared from acryl polyol or polyisocyanate, such as an acryl-urethane resin or a polyethylene-acryl modified polyurethane resin. Here, the polyhydric alcohol may be acryl polyol, polyester polyol, polyether polyol, polyolefin-based polyol, or a combination thereof. In addition, a molecular weight of the soft urethane-based resin may be 5,000 to 300,000. When the molecular weight of the soft urethane-based resin is less than 5,000, workability may be considerably degraded. Conversely, when the molecular weight of the soft urethane-based resin exceeds 300,000, the stability of the resin solution may be degraded.

In addition, the hard urethane-based resin may be a polyurethane resin prepared from polycaprolactone polyol or polycarbonate polyol and diisocyanate, especially, paraphenylene diisocyanate, a polyurethane resin prepared from 4,4'-bis(ω-hydroxyalkyleneoxy)biphenyl and methyl-2,6-diisocyanatehexanoate, or a polyurethane resin having an acetal bond. A molecular weight of the hard urethane-based resin may be 200,000 to 2,000,000. When the molecular weight of the hard urethane-based resin is less than 200,000, there is no effect of improving workability. When the molecular weight of the hard urethane-based resin exceeds 2,000,000, the stability of the resin solution may be reduced and the viscosity thereof may be increased, resulting in degraded workability. The hard urethane-based resin may have a Shore A hardness of 40 to 90 at the time of manufacturing a dry film. When the Shore A hardness is less than 40, there is no effect of improving workability. Conversely, when the Shore A hardness exceeds 90, the coated layer, i.e., the resin layer, is so hard that it may be crushed during processing, and thus, there is no effect of improving workability. Therefore, the urethane resin may have the aforementioned range of hardness.

Meanwhile, an acryl resin may be used as the binder resin. Since the acryl resin has excellent high temperature/high humidity resistance, cold resistance, and workability, and is also inexpensive, it is widely used for metal-surface treatment. As the acryl resin usable in the embodiment of the present inventive concept, an acryl-based resin synthesized with a general monomer composition including a carboxyl group sufficient to be solubilized may be used. The acryl-based resin monomer may be methyl(meth)acrylate, ethyl(meth)acrylate, isopropyl(meth)acrylate, normalbutyl(meth)acrylate, isobutyl (meth)acrylate, 2-ethylhexyl(meth)acrylate, hydroxypropyl(meth)acrylate, stearyl(meth)acrylate, or hydroxybutyl(meth)acrylate, but is not limited thereto.

A molecular weight of the acryl resin may be 50,000 to 2,000,000. When the molecular weight of the acryl resin is less than 50,000, there is no effect of improving workability. Conversely, when the molecular weight of the acryl resin exceeds 2,000,000, the stability of the resin solution may be reduced and the viscosity thereof may be increased, thereby resulting in degraded workability.

In addition, an epoxy resin may be used as the binder resin. The epoxy resin is widely used as a metal coating material due to excellent adhesion, corrosion resistance, and top coat paintability. The epoxy resin usable in the embodiment of the present inventive concept may be a bisphenol A-type resin, a bisphenol F-type resin, a novolac resin, or the like.

A molecular weight of the epoxy resin may be 500 to 25,000. When the molecular weight of the epoxy resin is less than 500, a crosslinking density may be increased, and thus it may be difficult to ensure workability. When the molecular weight of the epoxy resin exceeds 25,000, it may be difficult to solubilize the epoxy resin, and as the crosslinking density of a cured coated film is reduced, corrosion resistance may be lowered.

In addition, an ester resin may be used as the binder resin. The ester resin is widely used as a metal surface treatment agent due to excellent curability, chemical resistance, thermal resistance, plasticity, and adhesion to an organic material. The ester resin usable in the embodiment of the present inventive concept may be a polyester resin prepared from maleic anhydride, isophthalic acid, terephthalic acid, tetrahydrophthalic anhydride, methyltetrahydrophthalic anhydride, adipic acid or pimalic acid, an ethyleneglycol-modified ester resin, a propyleneglycol-modified ester resin, or a neophentylglycol-modified ester resin.

A molecular weight of the ester resin may be 2,000 to 20,000. When the molecular weight of the ester resin is less than 2,000, a crosslinking density may be increased, and thus workability may be degraded. Conversely, when the molecular weight of the ester resin exceeds 20,000, the cost is increased, and an increase in crosslinking density may lead to poor salt water resistance, resulting in degraded corrosion resistance.

In addition, an olefin resin may be used as the binder resin. The olefin resin has an effect of preventing scratches of a painted surface after metal surface treatment due to high water resistance, acid resistance, and salt water resistance. The olefin resin usable in the embodiment of the present inventive concept may be an aqueous polyolefin resin, and preferably, a polyethylene resin, a vinyl-modified polyethylene resin, a polyvinylbutylene resin, a vinylchloride copolymer resin, a vinylacetate copolymer resin, or a polyvinylalcohol resin.

A molecular weight of the olefin resin may be 50,000 to 2,000,000. When the molecular weight of the olefin resin is less than 50,000, a crosslinking density may be increased, and thus it may be difficult to ensure workability. Conversely, when the molecular weight of the olefin resin exceeds 2,000,000, it may be difficult to solubilize the olefin resin, and sedimentation of the resin occurs. Further, as the crosslinking density of a cured coated film is reduced, corrosion resistance may be lowered.

The polymer resin composition containing graphene, according to the embodiment of the present inventive concept, may be a composition including the polymer resin composition containing the binder resin and 0.01 to 20 wt % of graphene, more preferably, 0.1 to 20 wt % of graphene.

The polymer resin composition may play a role of ensuring corrosion resistance of the base steel sheet. Graphene in the polymer resin composition is provided to impart the inherent properties of graphene to the base steel sheet. The base steel sheet may obtain excellent thermal conductivity, as well as excellent corrosion resistance, from the graphene, thereby ensuring excellent weldability during processing.

As described above, in order to impart the inherent properties of graphene to the base steel sheet, the polymer resin composition for coating the base steel sheet is required to contain a certain amount of graphene. In this case, after graphene powder is added to the polymer resin composition, they may be mixed with each other.

Here, the content of graphene contained in the polymer resin composition may be 0.01 to 20 wt %. When the content of graphene is less than 0.01 wt %, the desirable graphene properties may be significantly limited. Conversely, when the content of graphene exceeds 20 wt %, there is no difficulty in obtaining the graphene properties, but an excessive amount of graphene may be non-uniformly coated on the surface of the base steel sheet.

A method of coating the top of the base steel sheet with the polymer resin composition containing graphene is not particularly limited. For example, a method of using a bar-coater, a roll-coater or a curtain coater may be used. As an example, in a case of a roll coating method using a roll coater, a composition to be coated (a graphene solution in an embodiment of the present inventive concept) may be put into a mixing tank, and it may be sufficiently stirred and transferred to a coater pan through a circulation pipe. Subsequently, the composition may be applied to the top of a plated layer by the roll coater in the coater pan, thereby coating the plated layer.

After the base steel sheet is completely coated with the polymer resin composition containing graphene, it may be dried and cured. Here, a general drying method commonly known in the art may be used. For example, a hot air heating method, an infrared heating method, or an induction heating method may be used. Subsequently, the coated solution may be sufficiently cured to form a hardened layer.

Meanwhile, in the embodiment of the present inventive concept, while the coated base steel sheet is dried, an electric field or a magnetic field may be applied to the bottom of the coated base steel sheet.

Applying the electric field or the magnetic field while drying the coated base steel sheet is intended to improve the adhesion of graphene contained in the coated solution, namely, the polymer resin composition. More specifically, the graphene may not be uniformly provided, but may be distributed inside the polymer resin composition immediately after the coating of the base steel sheet with the polymer resin composition containing graphene. The graphene may include functional groups (hydroxyl groups (OH)) at the edges thereof, and when the electric field or the magnetic field is applied thereto, it may attract or repel the functional groups of the graphene. In this manner, the distributed graphene may be concentrated on the interface between the base steel sheet and the resin composition, namely, the lower portion of the coated polymer resin composition or the upper portion thereof.

For example, while the coated base steel sheet is dried, a voltage of −200V to +200V (except for 0V) may be applied to the coated base steel sheet. Since the OH groups of the graphene have a negative (−) electric charge, when a positive (+) voltage is applied to the base steel sheet, the OH groups of the graphene may be arranged in a direction toward the base steel sheet, and when a negative (−) voltage is applied thereto, the OH groups of the graphene may be arranged in an opposite direction, whereby adhesion may be improved. Here, the graphene may be present in the form of sheets or may form a concentrated layer. In a case in which the graphene is present in the form of sheets, it may be advantageous to impart the inherent properties of graphene to the steel sheet.

In order to achieve the aforementioned effects, the level of voltage applied to the base steel sheet may change depending on the types of base steel sheets. A voltage range is not particularly limited, and a voltage of −200V to +200V (except for 0V) may be applied thereto.

Therefore, after the resin composition containing graphene is applied to the top of the base steel sheet, when a voltage of −200V to lower than 0 is applied thereto during drying, the graphene inside the subsequently formed polymer resin layer may be present in a direction toward the surface of the polymer resin layer opposite the base steel sheet, and when a voltage of higher than 0 to +200V is applied thereto, the graphene inside the subsequently formed polymer resin layer may be present in a direction toward the base steel sheet, namely, the lower portion of the polymer resin layer.

Therefore, in order to apply the voltage to the coated base steel sheet while drying the same as described above, a drying device having a direct current (DC) power supply may be used.

The surface-treated steel sheet prepared according to the embodiment of the present inventive concept may have the inherent properties of the graphene, namely, excellent thermal conductivity and the like, as well as excellent corrosion resistance. Therefore, in a case of subsequently welding the surface-treated steel sheet, weldability may be obtained.

MODE FOR INVENTION

Hereinafter, the present inventive concept will be detailed through examples. However, these examples are provided so that this inventive concept will be more completely understood, and are not intended to limit the scope of the inventive concept. The scope of the inventive concept is determined based on the matters claimed in the appended claims and modifications rationally derived therefrom.

Example

A base steel sheet formed of carbon steel was coated with a solution including a polymer resin composition containing a polyurethane resin as a binder and 1 wt % of graphene using a bar coater. While the coated base steel sheet was dried using a hot air heating method, a voltage of −200V, 0V, or +200V was applied to the bottom of the base steel sheet, and consequently, a surface-treated steel sheet was manufactured.

In order to evaluate adhesion between the base steel sheet and the polymer resin layer containing graphene in each surface-treated steel sheet manufactured by changing the applied level of voltage, the surface-treated steel sheet was cross hatch cut into slices (1*1 mm) ten times, and then an adhesion test was carried out through the attachment and detachment of tape. The test results are illustrated in table 1 below.

The adhesion was evaluated on the basis of the extent to which the polymer resin layers were delaminated from 100 square slices by the tape. Here, in a case in which the resin layer was not delaminated due to strong adhesion, it was evaluated as 100/100, while in a case in which the resin layer was entirely delaminated due to poor adhesion, it was evaluated as 0/100.

In addition, corrosion resistance was also tested for each surface-treated steel sheet, and the test results are illustrated in table 1 below.

The evaluation of corrosion resistance was made by a salt water spraying test on the basis of the elapsed time until an area of white rust becomes 5% of the surface area of the slice.

TABLE 1

| Applied Voltage | −200 V | 0 V | +200 V |
|---|---|---|---|
| Adhesion Evaluation | 90/100 | 95/100 | 100/100 |
| Corrosion Resistance Evaluation | 72 Hr | 48 Hr | 72 Hr |

As illustrated in table 1, according to the embodiment of the present inventive concept, in the case of applying the polymer resin composition containing graphene to the base steel sheet and applying the voltage thereto, excellent corrosion resistance as well as excellent adhesion between the base steel sheet and the resin layer may be obtained.

The invention claimed is:

1. A surface-treated steel sheet comprising:
a base steel sheet; and
a polymer resin layer containing graphene on the top of the base steel sheet,
wherein the graphene has hydroxyl groups (OH) at its edges,
wherein the hydroxyl groups (OH) of the graphene are arranged within the polymer resin layer toward the base steel sheet or toward a surface of the polymer resin layer, by applying an electric field or magnetic field to the coated base steel sheet during drying.

2. The surface-treated steel sheet of claim 1, wherein the graphene is present in the form of a concentrated layer or a sheet within the polymer resin layer.

3. The surface-treated steel sheet of claim 1, wherein the polymer resin layer containing the graphene has an average thickness of 0.5 to 5.0 μm.

4. The surface-treated steel sheet of claim 1, wherein the polymer resin layer containing the graphene is formed of a composition including a polymer resin composition and 0.01 to 20 wt % of the graphene, and the polymer resin composition includes:
10 to 90 parts by weight of at least one resin selected from the group consisting of a urethane resin, an acryl resin, an epoxy resin, an ester resin, and an olefin resin as a binder resin on the basis of a total weight of the resin composition; and
water as the remainder.

5. A method for manufacturing a surface-treated steel sheet, comprising:
preparing a base steel sheet;
coating the top of the base steel sheet with a polymer resin composition containing graphene; and
drying and curing the coated base steel sheet to form a polymer resin layer containing the graphene,
wherein the graphene has hydroxyl groups (OH) at its edges,
wherein the hydroxyl groups of the graphene are arranged within the polymer resin layer towards the base steel sheet or toward a surface of polymer resin layer by applying an electric field or a magnetic field to the bottom of the coated base steel sheet during drying.

6. The method of claim 5, wherein the polymer resin composition containing the graphene comprises:
the polymer resin composition including 10 to 90 parts by weight of at least one resin selected from the group consisting of a urethane resin, an acryl resin, an epoxy resin, an ester resin, and an olefin resin as a binder resin on the basis of a total weight of the resin composition, and water as the remainder; and
0.01 to 20 wt % of the graphene.

7. The method of claim 5, wherein a voltage of −200V to 200V, except for 0 Volts, is applied to the bottom of the coated base steel sheet during drying.

8. The method of claim 5, wherein the graphene is present within the polymer resin layer toward a surface of the polymer resin layer when cured after a voltage of −200V to lower than 0 is applied to the bottom of the coated base steel sheet during drying.

9. The method of claim 5, wherein the graphene is present within the polymer resin layer toward the base steel sheet when cured after a voltage of higher than 0 to +200V is applied to the bottom of the coated base steel sheet during drying.

* * * * *